United States Patent Office 3,326,013
Patented June 20, 1967

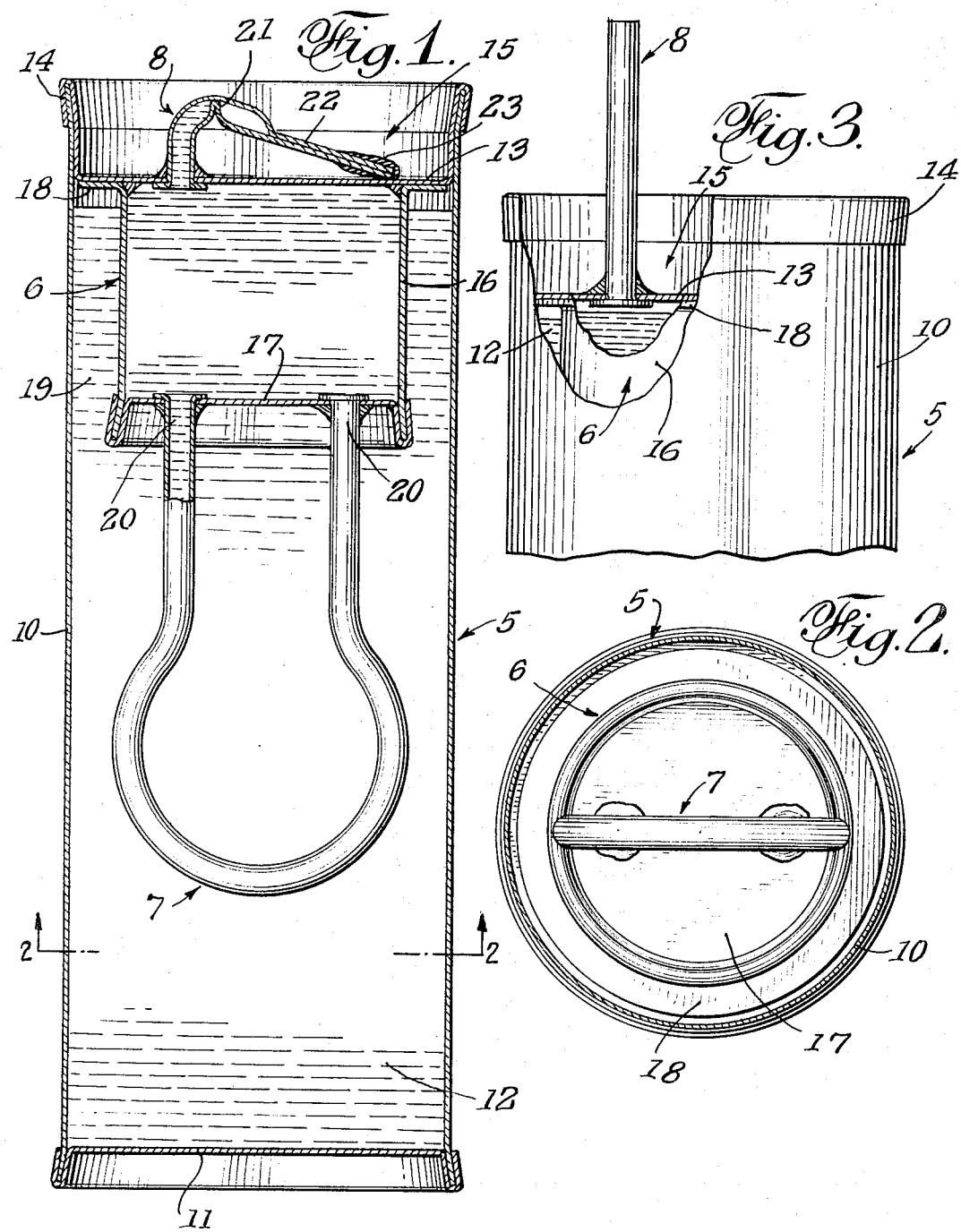

3,326,013
REFRIGERANT-CONTAINING FOOD OR
BEVERAGE CONTAINER
David M. Jacobs, 13531 Crewe St.,
Van Nuys, Calif. 91405
Filed Jan. 3, 1966, Ser. No. 518,346
3 Claims. (Cl. 62—294)

This invention relates to containers for comestibles provided with refrigerating means.

An object of the invention is to cool food products and beverages such as ice cream, soft drinks, or beer quickly and easily. A further object is to provide self-contained refrigerating means in containers such as beverage or food cans, bottles, or the like.

An additional object is to enable individual self-cooling containers to be carried and utilized by the ultimate consumer readily and conveniently at the point of consumption, such as at picnics, ball parks, etc., where it is not practical for the food or beverage consumer to resort to cumbersome refrigerating apparatus.

A further object is to provide comestible containers with an individual supply of refrigerant and with evaporating means arranged to permit convenient placing thereof in operation whenever cooling is desired.

This invention also has for its objects to provide such means that are positive in operation, convenient in use, easily installed in a working position and easily disconnected therefrom, economical of manufacture, relatively simple, and of general superiority and serviceability.

The above objects of the invention are realized in a device comprising an outer sealed container, can, or nonmetal receptacle for comestibles, for example, beer, carbonated drinks, juices and other beverages, or other foods requiring refrigeration for best taste satisfaction, an inner container of refrigerant, advantageously dichlorodifluoromethane (Freon-12), or monochlorodifluoromethane (Freon-22), that is, non-inflammable, non-toxic, colorless and non-corrosive liquid paraffin hydrocarbons containing one or more atoms in the molecule; said inner container being carried by one end of the outer container and extending into the interior thereof; a refrigerant-filling tube, closed after filling of the inner container, to keep the refrigerant under a pressure level that prevents evaporation thereof; and a refrigeration tube or coil extending from said inner container farther into the interior of the outer container so said inner container and said coil are enclosed in the contents of the outer container to cool the same, upon opening of the filler tube which institutes the refrigeration process. Under interior pressure, the refrigerant is forced from the inner container to atmosphere where the same rapidly expands to a gaseous state. As a result of the velocity of the refrigerant movement, expansion takes place in the inner container and the coil, the vaporization of the refrigerant liquid causing absorption of the latent heat of evaporation of the refrigerant from the contents of the outer container, cooling the same. The cooling process is completed in a minute or two, or as long as it takes for the vapor phase of the refrigerant to be fully vented. Now, the opposite end of the outer container may be opened in a conventional manner to provide access to the refrigerated contents therein.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a longitudinal sectional view of a refrigerant-containing food or beverage container embodying a preferred form of the present invention.

FIG. 2 is a cross-sectional view thereof, as taken on line 2—2 of FIG. 1.

FIG. 3 is a broken and partly sectional view of the refrigerant filling end of the present container showing the same in filling condition.

The device of the present invention comprises, generally, an outer sealed container 5 for comestibles or beverages, especially the latter, an inner refrigerant-holding container 6 carried by one end of the outer container, an evaporation coil 7 extending from the container 6 farther into the interior of the container 5 so the same and the container 6 are enclosed within the contents of container 5, and a filler tube 8 extending outwardly from the inner container and transformable into a frangible closure of said container.

The container 5 conventionally comprises a cylindrical wall 10 of somewhat longer but otherwise typical size and form, a conventional end closure 11 adapted to be opened in any of the several known ways to provide access to the contents 12 of the container 5, and a closure 13 at the opposite end of the wall 10, the same, in this case, being set inward from the flange 14 at said end to provide a well 15 of substantially greater depth than is conventionally provided in containers of this general character. The foregoing, except of the deeper well 14, describes a typical tin can, it being understood, however, that plastics or other materials may replace the sheet metal of such cans.

The refrigerant-holding container 6 is shown as a cylindrical wall 16, the central portion of the closure 13 of the container 5 as one end closure of said container 6, and an end closure 17 at the opposite inner end of the wall 16. A flange 18 on said wall 16 is secured to said closure 13, thereby fixedly holding the container 6 as an inwardly extending can preferably coaxial with the wall 10 of the outer can 5. The diameter of can 6 is preferably such as to provide an annular space 19 around the latter can, the contents 12 of the outer can 5, especially if the same is a beverage, filling said space substantially as shown in FIG. 1. The container 6 is preferably made of sheet metal.

The evaporator coil 7, also of metal, is shown as a loop that has its ends 20 connected to the closure 17 of the refrigerant-holding container 6, the same extending into the interior of the can 5 toward the closure 11 of the latter. The coil 7 may be provided with one or more full turns of tubing and may extend into the container 5 to a greater or lesser distance than is shown, as desired. Said evaporator coil fills with refrigerant during the filling of the inner container.

The filler tube 8 preferably extends from the closure 13 and is of sufficient length so the same may be crimped, as at 21, after the container 6 and coil 7 are charged with refrigerant to serve as a closure valve that seals in the refrigerant. The tube 8 is also bent over so as to reside in the well 15 below the outer end of the flange 14. The bent portion 22 may be flattened to further close the tube 8 and the end sealed with solder 23 as a further precaution against accidental venting of said tube under the pressure in the container 6. It will be noted that the portion 22 is of sufficient length for each gripping between the fingers. The above crimp 21, flattened portion 22 and solder seal 23 are merely exemplary of means for providing the filler tube 8 with means to close the same until it is desired to vent said tube which is easily accomplished by lifting the end 22 thereof so the same will break away at the crimp 21 so that, due to the resultant partial straightening of said tube, the end of the same is open to atmosphere.

The refrigerant, under the inner pressure, rushes out from the broken open end of tube 8 and expands into the atmosphere as a harmless gas or vapor. As a result of the velocity of the refrigerant moving from the container 6, expansion takes place, also, in said container and the coil 7. This conversion of the refrigerant from a liquid to a vapor or gas within the container 6 and the coil 7, results in the absorption of the latent heat of evaporation of the refrigerant around said container and coil, cooling the contents 12 within the outer container 5. Freon-12 or Freon-22, as hereinbefore indicated, have the refrigerant and safety properties and are examples of the type and form of refrigerant desired to be used.

It will be understood that, when the refrigerant escapes, it not only expands, but absorbs heat from the contents 12 as a result of the conversion of the pressure energy into kinetic energy. Consequently, the container 6 and coil 7 rapidly cool said contents 12, one to three minutes being all the time required to effect suitable refrigeration of said contents. When the closure end 11 is removed, punctured or otherwise opened, access is obtained to said refrigerated contents for removal thereof by pouring, spooning or in other ways.

The emptied container 5 may then be discarded, as are tin cans of various sorts.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A self-cooling food or beverage holder comprising:
   (a) a sealed outer container for material to be cooled,
   (b) an inner container carried by a wall of the outer container and filled with expansible refrigerant, said inner container encompassed by said material, and
   (c) a filler tube for refrigerant under pressure and extending from the inner container, said tube being provided with a crimp to close the same, thereby sealing the refrigerant under pressure within the inner container,
   (d) said tube being frangible and adapted to be broken at said crimp to vent the inner container to atmosphere for instituting cooling of said material as a result of expansion and conversion of the refrigerant to a vapor as it vents from the broken end of the tube,
   (e) said expansion promoting heat absorption in the inner container and heat-exchange cooling of said material,
   (f) the outer container being provided with opposite closures, one of said closures being recessed inwardly from the adjacent end of said container further than the other closure is recessed from its adjacent end, thereby forming a well,
   (g) the central portion of said one closure constituting one end closure of the inner container and through which the filler tube extends outwardly,
   (h) said filler tube, from a straight filling condition, being bent toward the closure from which it extends to reside wholly within said well.

2. A self-cooling food or beverage holder according to claim 1 in which:
   (a) said bent portion of the filler tube is independently sealed,
   (b) said latter portion constituting a handle that, when bent upwardly, breaks the tube at the crimp therein.

3. A self-cooling food or beverage holder according to claim 1 in which:
   (a) the inner container is provided with an end closure directed toward said other end closure of the outer container, and
   (b) an evaporator coil extending from said end closure of the inner container and, also, encompassed by the material in the outer container.

References Cited

UNITED STATES PATENTS

| | | | |
|---|---|---|---|
| 2,460,765 | 2/1949 | Palaith | 62—294 |
| 2,898,747 | 8/1959 | Wales | 62—294 |
| 3,229,478 | 1/1966 | Alonso | 62—371 |
| 3,257,821 | 6/1966 | Warner | 62—371 |

WILLIAM J. WYE, *Primary Examiner.*